3,326,118
GRILL FOR ROASTING MEAT
Erich Block, Munich-Untermenzing, Germany, assignor to Wienerwald-Geratebau G.m.b.H., Munich, Germany
Filed May 18, 1964, Ser. No. 368,307
Claims priority, application Germany, May 17, 1963, W 34,513
8 Claims. (Cl. 99—420)

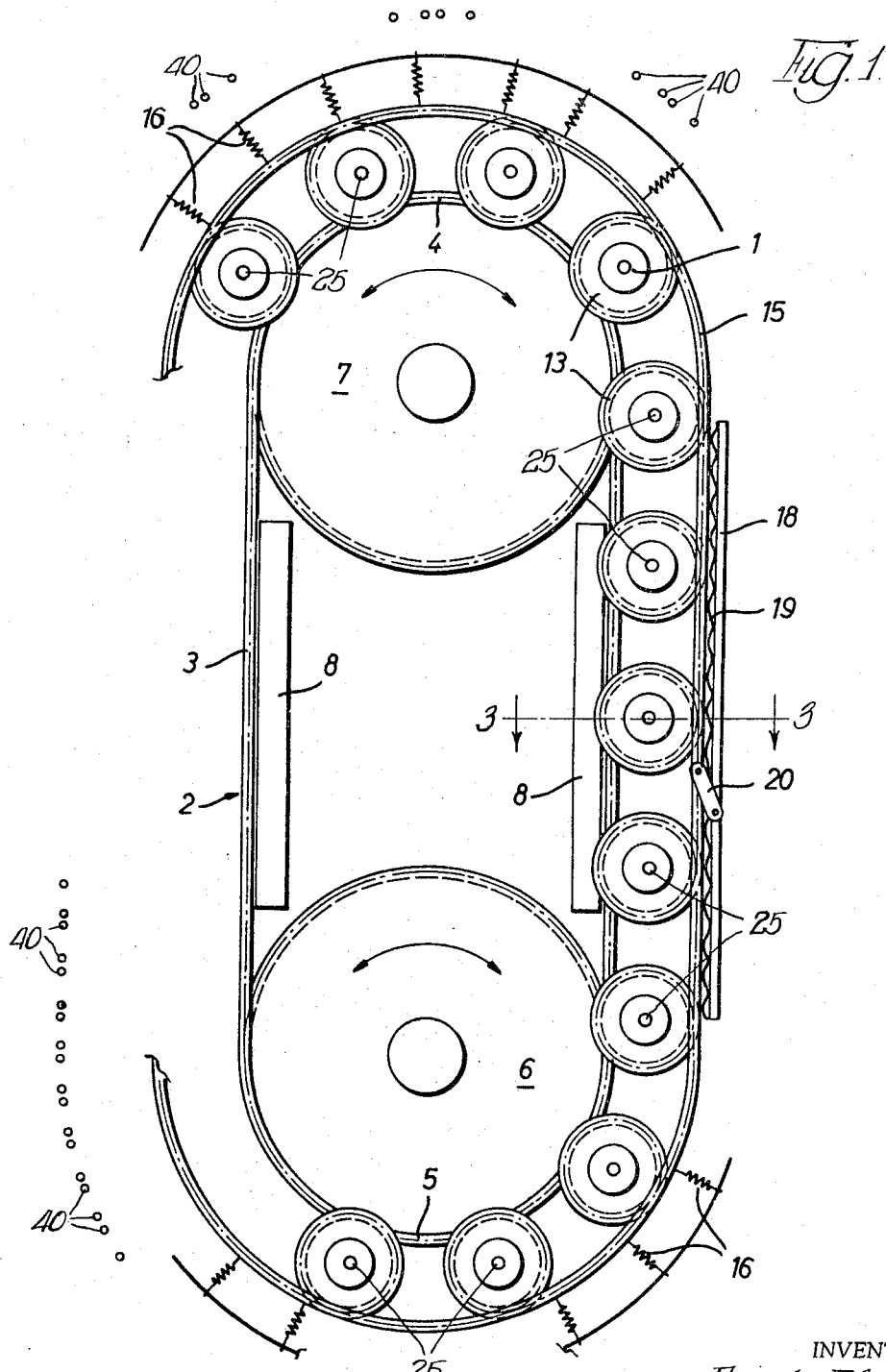

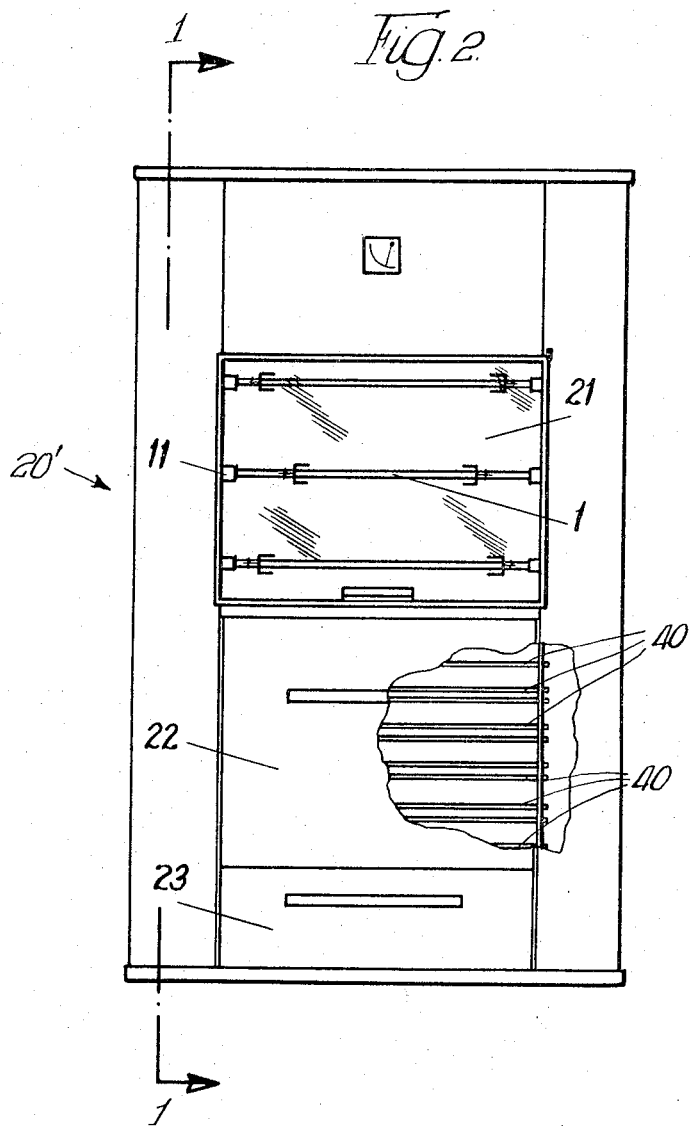

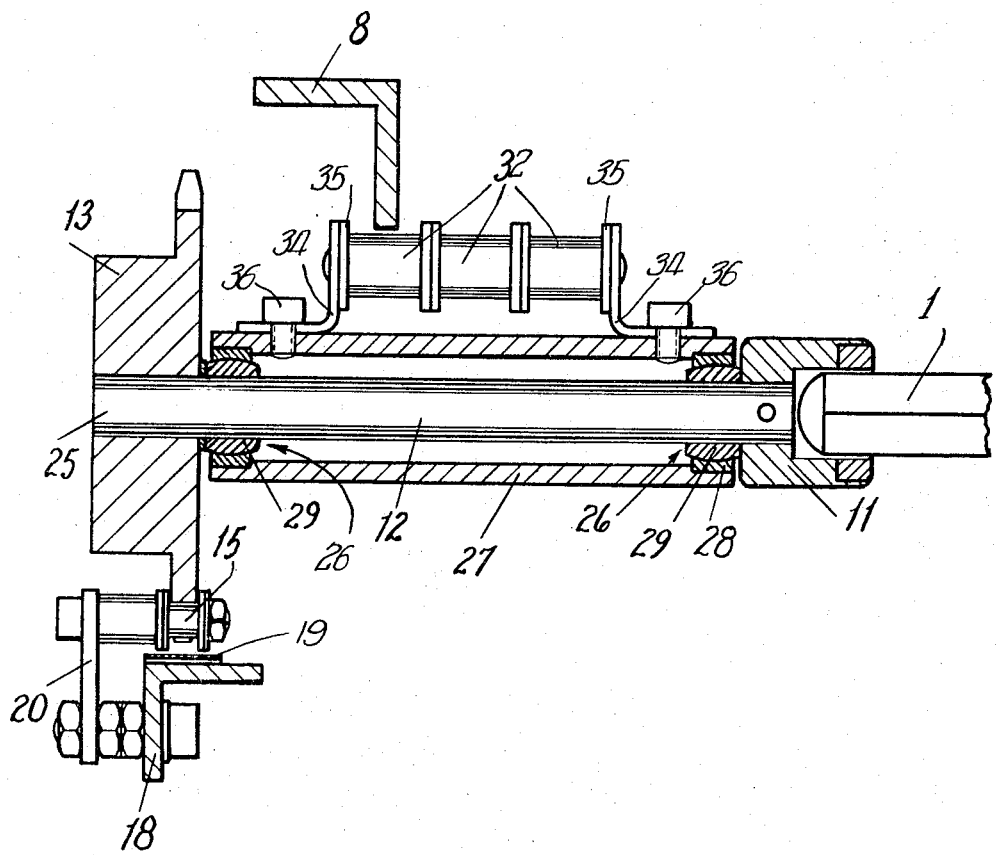

When subjecting roasting chickens or other meats to be grilled on a spit, it is an object to house as many spits as possible in a casing in order to utilize the available space to best advantage and to consume as little energy for heating as possible.

In one known device, the spits are distributed equally spaced over the circumference of a driven supporting disc and, in addition, are mounted rotatably on said disc; the drive means is a planetary gear consisting of a sun gear and planetary pinions which are so driven that they additionally move the spits about their own axes. The capacity of such a device, however, is limited due to the small diameter of the path over which the spits travel. It is a further shortcoming that, because of the vapors developed during grilling, a deposit is soon formed on the gears, as well as on the gear rim, which causes carbonization and leads to clogging of the planetary gear with reduced wear and rapid deterioration, e.g. by locking the gears in the gear rim.

According to another known arrangement, spits are superposed vertically in a stationary manner but rotatable around their own axis. In this way, it is possible to house a larger number of spits in a single unit. However, this arrangement involves almost insuperable difficulties due to heat convection, whereby it is impossible to heat the superposed spits evenly. An attempt has been made to overcome this difficulty by using graded heating units. This, however, requires considerable care in the dimensioning and arrangement of the heating units, without providing the required uniform heating and an even roasting time.

It is the object of the present invention to provide a grill having a higher capacity than the known devices while avoiding the shortcomings above-mentioned.

In order to accomplish these objects, a special planetary gear is used according to the invention which has a longer useful life and is considerably less expensive than known planetary gears, and which combines the principle of the first-mentioned known grill, while lengthening the path of the spits from a circular shape to that of an elongated O-shape, thereby arriving at the double capacity as compared to the second-mentioned known vertical grill unit.

The device according to the invention provides as a supporting means for the spits instead of a disc an endless chain travelling substantially along two parallel vertical straight lines connected to each other by two semi-circular portions. In order to avoid the shortcoming of a planetary gear drive with gear rim and gear pinions, the planetary gears are substituted by sprocket wheels and the sun gear by an endless sprocket chain held in accordance with the path of the planetary pinions. The sprocket is maintained under tension by springs arranged along the upper and lower semi-circular portions of the sprocket, the spring exerting an outwardly directed force approximately normal to the curvature of the sprocket.

With the grill constructed in accordance with this invention, one hundred chickens can easily be roasted in one course of heating. All the chickens are exposed to the same amount of heat due to their travel so that they will be ready at the same time. In the arrangement according to the invention, the heat convection (thermal syphon action) may be utilized to advantage. It is frequently only necessary to arrange a strong source of heat laterally in the bottom portion of the device and provide another heater at the top. As compared to the known grill arrangement mentioned above as an alternative, a saving of current may be achieved which amounts to 30% per chicken.

The particular type of planetary gear drive used according to the invention has a number of advantages: It is simpler to manufacture, is less expensive, and, at the same time, it has a longer useful life since the sprocket wheels continually exert a cleaning action on the sprocket. By means of the springs, the sprocket is re-tensioned all the time. Due to the fact that the springs act on the sprocket at a certain distance at each other, they will tension the sprocket with respect to the sprocket wheels. It should be noted that a sprocket-planetary drive may also be used for a grill in which the spits are arranged to travel over a circular path. The arrangement according to the invention avoids by cheaper, simpler and more reliable means, the shortcomings of devices of known constructions which are supposed to prevent the disadvantages of planetary gear drives with gear pinions and gear rim. For turning the spits about their own axes the alternative solutions provide complicated push rod systems or systems with levers and stoppins in which each spit is moved on after a certain time over an angular path.

In the arrangement according to the invention, it is advantageous to use a sprocket with multiple chain members because such a sprocket has a satisfactory stability against lateral displacement from the plane of its travel.

In order to prevent the sprocket which acts as a sun gear rim, from a displacement out of its plane while it travels on the straight line portion, it is advantageous to arrange ledges or rails which serve as abutment from the outside. The effect of these rails can be strengthened by an undulating spring arranged between the rail and the sprocket. This spring presses the sprocket against a passing sprocket gear pinion. It is also advisable to provide between two gear wheels supporting the sprocket in the straight portions of the path another couple of rails serving as abutment from the inside.

Since, in a grill according to the invention, the central portion of the housing can be freed of driving and heating units for the spits, it is a further element of the invention that the inside of the grill may be made visible for observation through windows provided in the front and rear walls of the housing. This is very impressive for the customers when the grill is used in restaurants, and it may be considered as a means for promoting the device.

The capacity of the grill according to the invention is frequently larger than needed, e.g. it may serve for one hundred chickens, while only fifty are grilled at a time. In order to avoid the necessity to provide for such cases another type of grill, which would involve special expenses, the spare room may be used for another purpose. It has, therefore, been provided that the space which has become available should be used as a heat storage compartment or alternatively as a cool storage compartment. The combination of a cooling compartment with a grill is particularly advantageous for shops having only a small demand for grilled meat, because this makes it possible to store the meats as well as prepare them in one and the same unit.

A special difficulty is often found to reside in the bearing arrangements for the spits or their supporting parts. Up to the present, slide and ball bearings have been used. However, due to the deposits caused by the vapors formed during the grilling operation, the bearings are rapidly worn out and become useless. Particularly, when the chickens, which are to be grilled, have previously been rubbed with salt water, the bearings are especially exposed to corrosion. It has been found in practice that even slide bearings lined with oil soaked sintered bronze do not serve any useful purpose for longer than a quarter of a year. Other slide and ball bearings are even used up much faster. Before the known bearings for grills become completely worthless, they are, as a rule, worn down to an extent that the spits will no longer be properly held in place and will move irregularly. Since in the grill according to the invention the spits are held in a comparatively flexible support, it is necessary to provide a better bearing arrangement for them in order to maintain a useful life of the bearing which corresponds to the construction of the unit as a whole.

In order to obviate the above, the spits according to the invention are held in at least two ball and socket points arranged axially behind each other. Experience has shown that such bearing arrangements have a useful life of more than one year even when the grill is exposed to rough handling and regardless of the high temperatures from 200 to 300° C. In general, it is not necessary to lubricate the joints in any particular manner. However, it is advisable to provide the surface with a special contact layer, e.g. burnt-in molybdenum sulfide.

It is of no consequence when, during the operation, there is a play between the bodies of the ball and socket joints. According to the invention, such play is rather provided in general during the manufacture. Due to a shearing action between the joint bodies, care is taken that any grease residues between the bodies will be rapidly removed instead of becoming fixed in the joint, which frequently happens in known grill spit bearings.

The new bearings for the spits are inexpensive and can be easily exchanged.

In the following, a preferred embodiment of the device according to the invention is illustrated in the accompanying drawings of which FIG. 1 shows a side elevation of the grill according to the invention and its driving mechanism;

FIG. 2 is a front view of the housing; and

FIG. 3 illustrates, partly in section, a bearing arrangement for the spits of the grill.

Referring now to FIG. 1, a spit is designated by 1 and an endless three-membered supporting sprocket by 2. Each spit is rotatably mounted in a bearing hereinbelow described with reference to FIG. 3, said bearing being connected by means, such as clamps, (not shown) to the sprocket 2. The sprocket moves along two parallel vertical lines 3 and two semi-circular portions 4 and 5 connecting the straight portions. The sprocket is supported by a driving wheel and a synchronously driven wheel 7, and along the wide straight portion 3 there are pressure rails 8 for abutment.

Each spit 1 is fastened, as shown in FIG. 3, by a shaft 12 received in an end portion 11 to a sprocket gear pinion 13, which is in engagement with an endless stationary sprocket chain 15 acting as a sun gear rim. The sprocket chain 15 is maintained in position by springs 16 which act on the chain and tension the same along the semi-circular portions. Along the straight line portions of chain 15 outer pressure rails 18 are provided which act on chain 15 over an undulating spring 19. A further means for holding the chain in place is a lever 20 pivotally connected to rail 18, said lever permitting only a slight yielding of the chain out of its plane. Such yielding occurs always when a planetary pinion 13 passes this place. The traction springs 16 and the undulating spring 19 serve for re-tensioning chain 15.

FIG. 3 also illustrates the bearing arrangement for the spits according to the invention. The shaft 12 to whose end 25 the planetary gear pinion 13 is fastened is mounted by means of two ball and socket joints 26 in a bushing 27 attached to the sprocket chain 2.

Between the socket 28 and the ball 29 of each bearing a certain amount of play is provided in order to scrub off any precipitation formed during the operation.

It will be realized that the bearing is small and has a low heat capacity, that is to say, it will cool very fast. Due to the fact that, with the grill according to FIG. 1, it is connected to a sprocket and not, as in the conventional grills, to a solid disc, it does not absorb so much heat to begin with, especially due to the fact that the arrangement only provides small surfaces for heat transfer.

The cooperating faces of the two joint-forming parts 28 and 29 are provided with burnt-in molybdenum sulfide layers acting as an emergency lubrication. This makes operation of the bearing possible over more than a year without maintenance. For special purposes, it is possible to provide lubricating nipples.

The reference numeral 32 designates the three members of the chain 2, which is in this special case three-membered. The sleeve 27 is fixed to the chain by two angular butt straps 34 which by the interposition of one spacing bushing 35 each is fastened by screws 36 engaging threaded holes of the sleeve 27.

As already described above the spits 1 are connectable with the receiving portion 11.

The front view, FIG. 2, shows the grill casing 20' having an observation window (21) to which a similar window in the rear of the casing corresponds. Furthermore, the figure illustrates a compartment 22 for housing a motor (not shown) and a storage compartment 23 alternatively serving for hot or cold storage; a door is shown at 24.

A heating means 40 is shown in diagrammatic form in FIGS. 1 and 2 and may be positioned at approximate points around the entire sprocket chain. As is seen in the cut-away portion of FIG. 2, the heating elements may remain within the transverse limit defined by the spit receiving portion 11. In this manner, direct heat on the sleeve 27 and associated bearing assemblies 26 is obviated.

Although the present invention is described in connection with a single embodiment, it is not intended that this be limiting inasmuch as such was done in the interest of brevity and clarity of description. It will become immediately obvious to those skilled in the art that certain modifications and variations of the invention may be made without departing from the true spirit and scope thereof and therefore only such limitations should be imposed as are indicated in the appended claims.

What is claimed is:

1. A grill for roasting meat comprising in combination a plurality of spits, a moving chain support for said spits on which the same are mounted for travel along an endless path, a plurality of planetary gear pinions in which said spits are mounted for rotation about their axes, a stationary sprocket chain forming a sun gear rim for engagement with said planetary gears, means biasing the stationary sprocket chain towards a moving sprocket chain, and spring means arranged along top and bottom semi-circular portions of said stationary sprocket chain for exerting a force normal to the curvature of the sun gear chain acting outwardly for tensioning said chain.

2. A grill for roasting meat comprising in combination a plurality of spits, a moving chain support for said spits on which the same are mounted for travel along an endless path having straight and arcuate portions, a plurality of planetary gear pinions in which said spits are mounted for rotation about their axes, a stationary sprocket chain forming a sun gear rim for engagement with said planetary gears and assuming a shape similar to said moving chain, means biasing the stationary sprocket chain towards said moving sprocket chain along said straight portions, said means including rail means arranged along the straight portions of said sun gear sprocket and having an undulating spring acting between said rails and said stationary sprocket chain to resiliently act against said sprockets.

3. A grill for roasting meat comprising in combination a plurality of spits, a moving chain support for said spits on which the same are mounted for travel along an endless path, a plurality of planetary gear pinions in which said spits are mounted for rotation about their axes, a stationary sprocket chain forming a sun gear rim for engagement with said planetary gears, means holding the stationary sprocket chain in engagement with a moving sprocket chain, and spring means arranged along top and bottom semi-circular portions of said stationary sprocket chain for exerting a force normal to the curvature of the sun gear chain acting outwardly for tensioning said chain.

4. The grill for roasting meat of claim 3 including a plurality of bushing means joined to said chain support at spaced points and each of said spits being mounted on said moving chain support through a pair of spaced ball and socket bearings carried in said bushing means, said ball and socket being loosely interfitted to provide appreciable lateral and radial play to exert a self-purging action at the interface between said ball and socket bearings.

5. A grill for roasting meat and the like comprising a pair of spaced moving chain supports, a plurality of bushings attached at spaced intervals around each of said chain supports for movement therewith, a pair of bearing means mounted in each of said bushings, each of said bearing means being axially spaced and including a ball and a socket, said socket being snugly received within said bushing, said ball snugly receiving a shaft projecting from opposite ends of each of said bushings, said ball being freely movable laterally and rotationally to an appreciable degree within said socket thereby to purge dirt and foreign material from said bearing means during movement of said chain support, sprocket means on one end of said shaft engageable with the stationary sprocket to cause rotation of said shaft when said moving chain is in motion, and means at the other end of said shaft releasably mounting a food receiving spit for rotation with said shaft.

6. The grill of claim 5 wherein each of said ball and sockets includes a wear-resistant, self-lubricating contact layer.

7. A grill for roasting meat comprising in combination a plurality of spits adapted to be mounted for movement about an endless path having straight and semi-circular sections, said spits being carried between a shaft rotatably supported in a bushing means, said bushing means being carried for movement with a movable sprocket chain, a stationary sprocket chain disposed outwardly of said movable sprocket chain and assuming the same general configuration, sprocket means mounted on said shaft and engageable with said stationary chain to rotate said shaft on said spit, means urging said stationary chain toward siad moving chain, and spring means tensioning said stationary chain in the region of the semi-circular sections.

8. A grill for roasting meat comprising in combination a plurality of spits adapted to be mounted for movement about an endless path having straight and semi-circular sections, said spits being carried between a shaft rotatably supported in a bushing means, said bushing means being carried for movement with a movable sprocket chain, a stationary sprocket chain disposed outwardly of said movable sprocket chain and assuming the same general configuration, sprocket means mounted on said shaft and engageable with said stationary chain to rotate said shaft on said spit, means urging said stationary chain toward said moving chain, said means urging said stationary chain toward said moving chain including rail members adjacent a straight section of said chain, and spring means interposed therebetween.

References Cited
UNITED STATES PATENTS

| 1,098,551 | 6/1914 | Beckman | 99—360 |
| 1,638,452 | 8/1927 | Panajiotaros et al. | 99—240 |
| 2,333,175 | 11/1943 | Henley | 99—420 |
| 2,565,786 | 8/1951 | Spartalis | 99—421 |
| 2,655,096 | 10/1953 | Ebin | 99—420 |
| 2,924,169 | 2/1960 | Scott | 101—40 |
| 2,995,813 | 8/1961 | Board | 308—72 |

WALTER A. SCHEEL, *Primary Examiner.*

ROBERT E. PULFREY, WILLIAM I. PRICE, S. P. FISHER, W. A. VANSANTEN, JR.,
*Assistant Examiners.*